April 18, 1939.   E. T. GARD   2,154,840
EARTH CONDITIONING MACHINE
Filed March 11, 1937   4 Sheets-Sheet 1
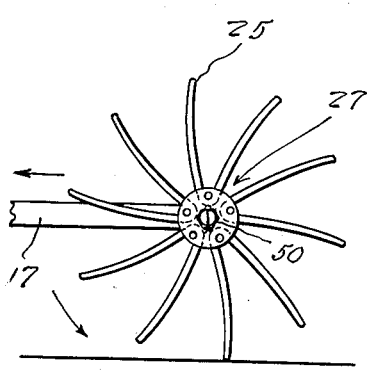
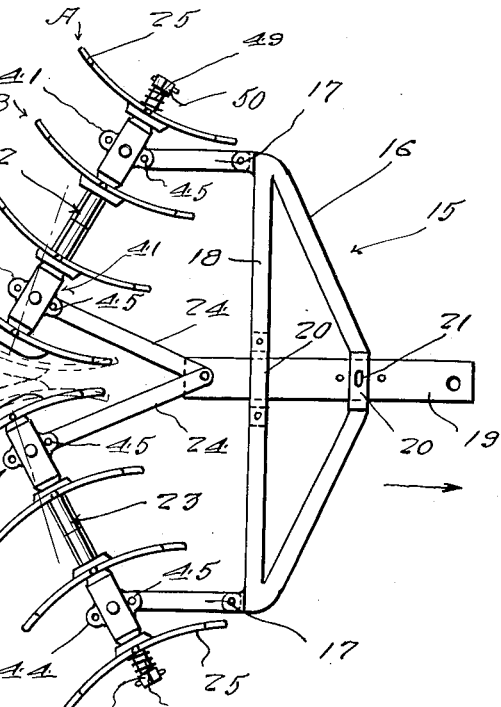
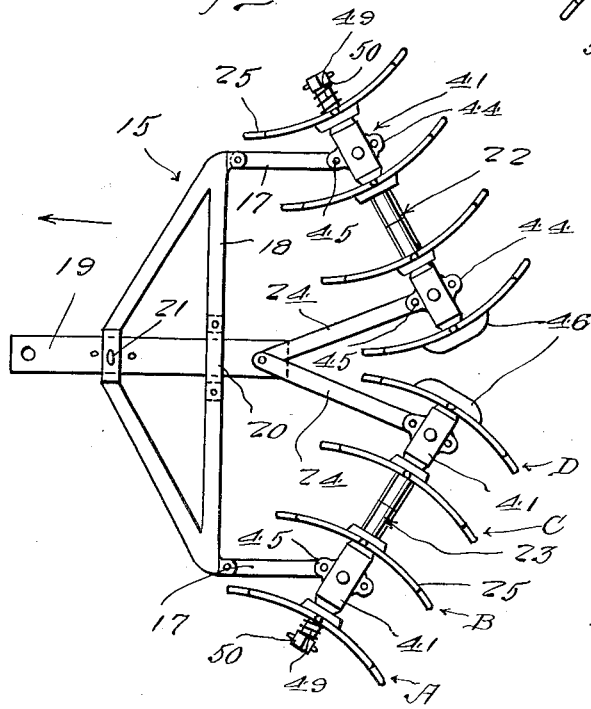
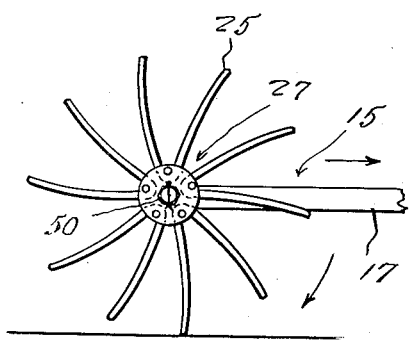
Inventor
E. T. Gard
By Clarence A. O'Brien
Hyman Berman
Attorneys

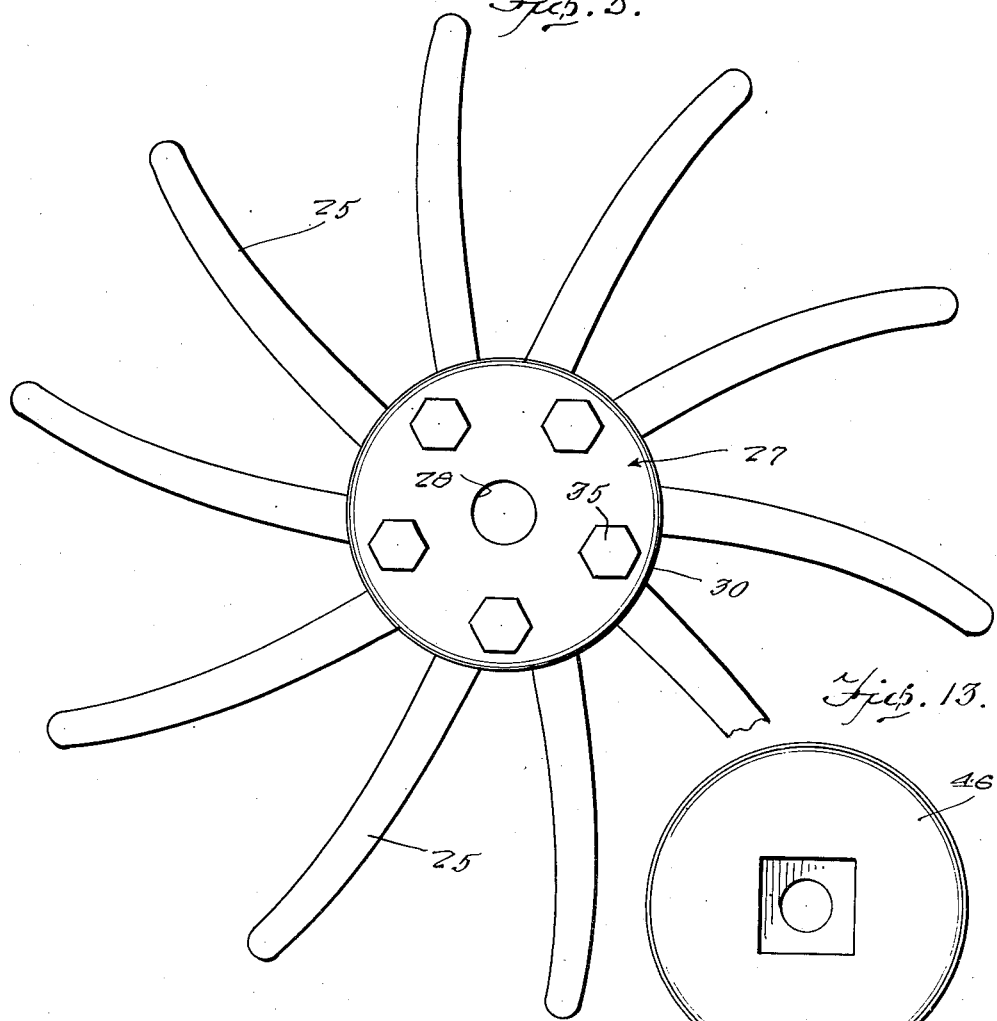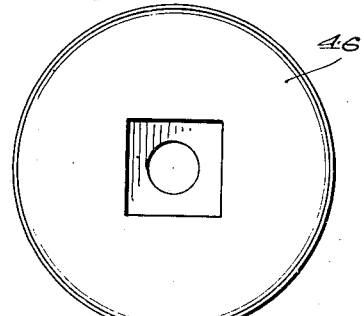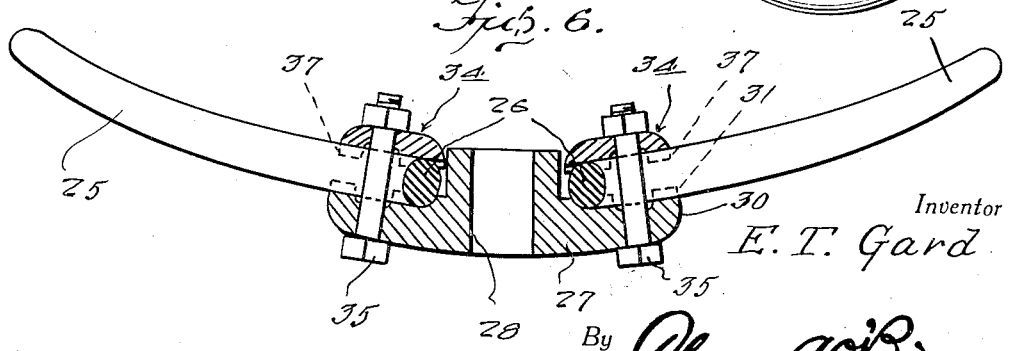

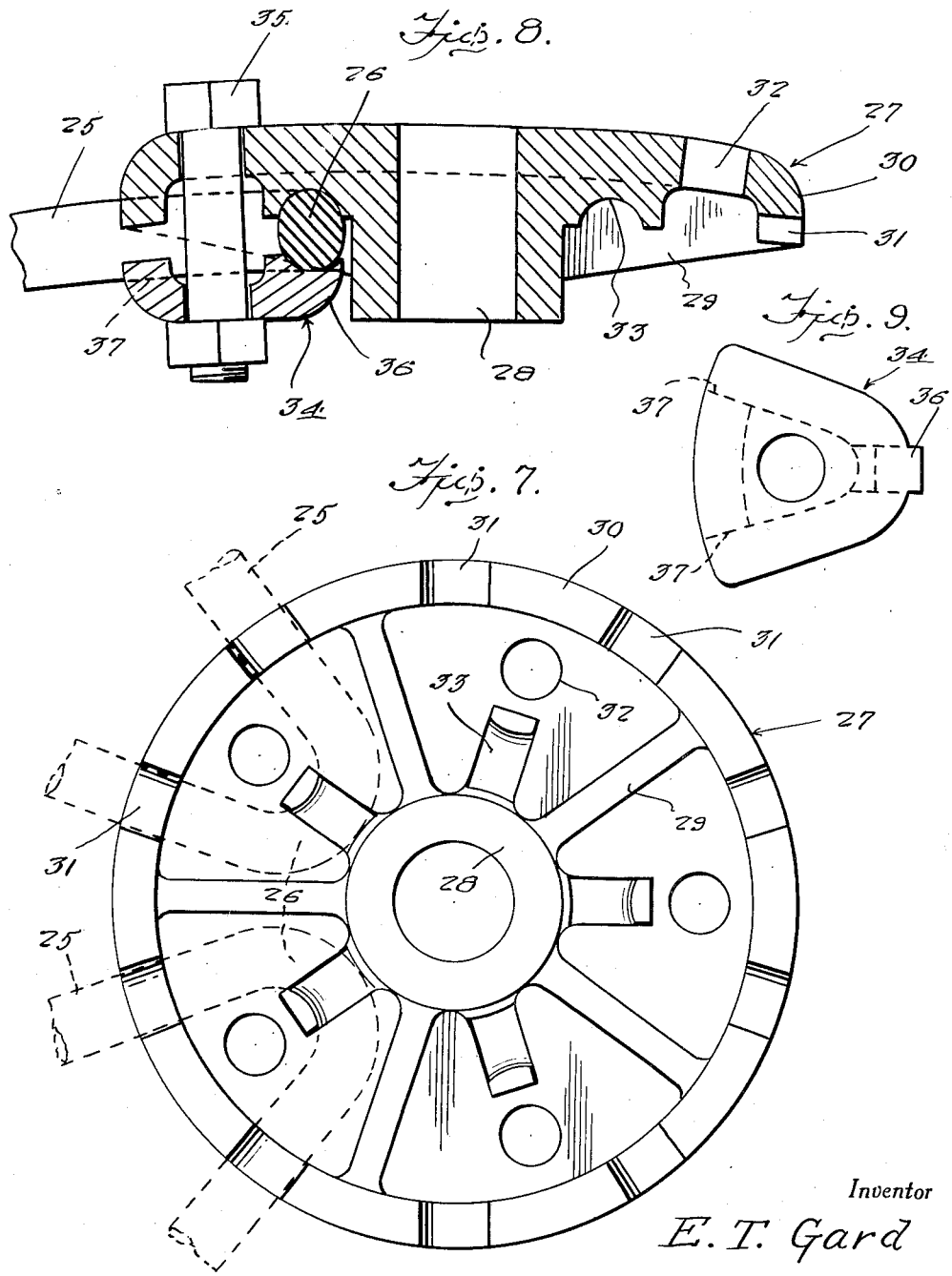

April 18, 1939.   E. T. GARD   2,154,840
EARTH CONDITIONING MACHINE
Filed March 11, 1937   4 Sheets-Sheet 4
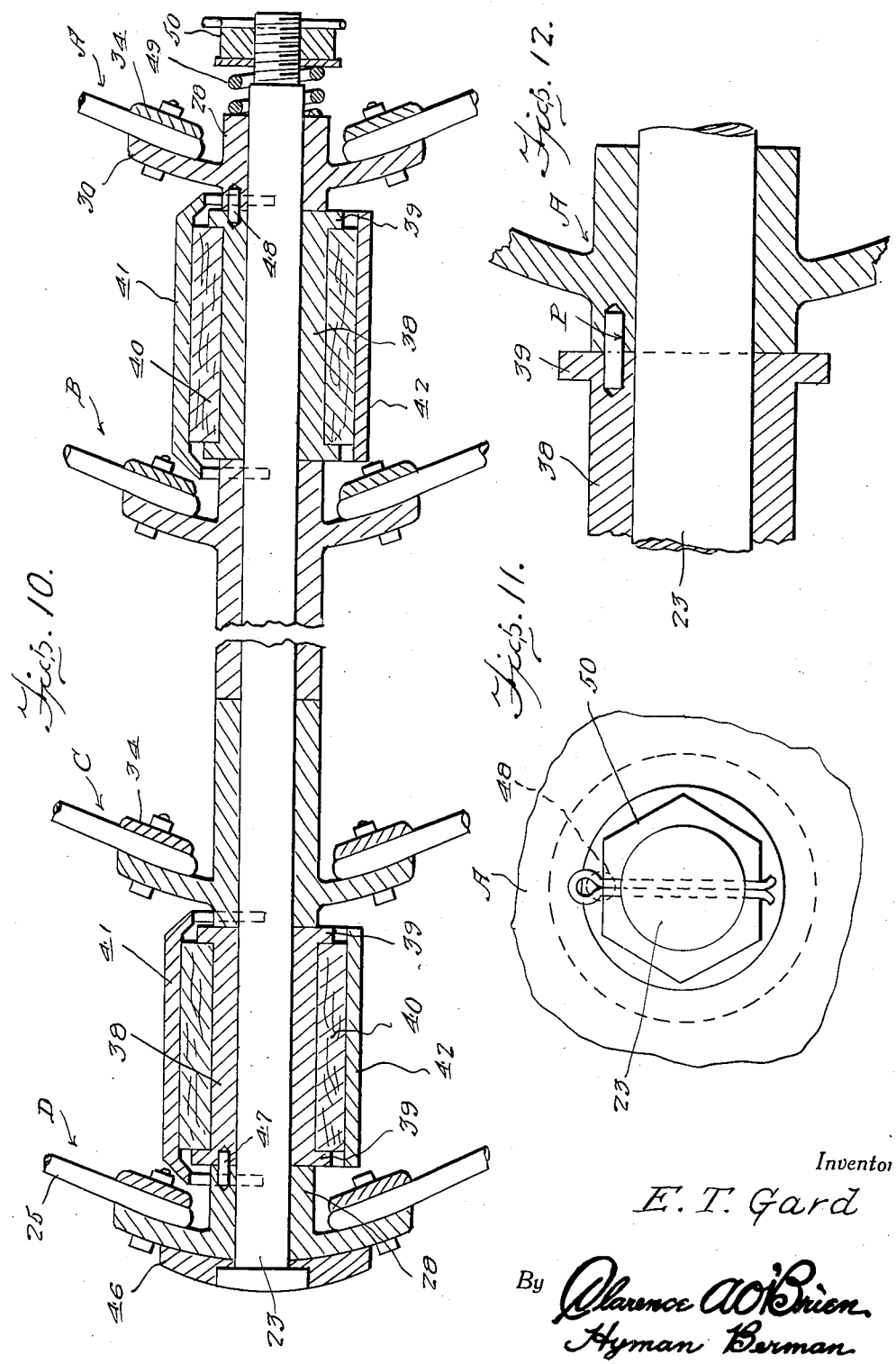
Inventor
E. T. Gard
By Clarence A. O'Brien
Hyman Berman
Attorneys Patented Apr. 18, 1939

2,154,840

UNITED STATES PATENT OFFICE 2,154,840

EARTH CONDITIONING MACHINE

Eldon T. Gard, South Bend, Ind.

Application March 11, 1937, Serial No. 130,368

3 Claims. (Cl. 55—11)

The present invention relates to that classification of farming and agricultural machines grouped under the sub-division of cultivators and earth conditioning structures, and has reference in particular to what may be conveniently called a two-way V-shaped harrow utilized when pulled in one direction as a clod breaker, and when moved in the opposite direction as a sod lifter.

Giving here a brief résumé of the preferred embodiment of the invention, it will be observed that it comprises an especially constructed yoke with which the draw-bar has adjustable slidable connection, there being diverging shafts pivotally attached to the ends of the arms of the yoke and the inner adjacent ends of the shafts being joined by regulating or adjusting links to the adjacent end of the draw-bar. It follows, therefore, that an outstanding advantage of the invention is to provide a structure wherein the earth-working implements may, in conjunction with their supporting shafts be disposed in varying angular relationships to accommodate variable earth conditions.

The chief object of the invention, however, has to do with the yoke construction and the diverging shafts wherein multiple toothed wheels are mounted on said shafts and the yoke has reversible connection with said shafts, whereby it may be switched or thrown over from one position to the other to accomplish the desired conversion result, whereby the toothed wheels can be utilized when the machine is pulled in one direction for clod breaking, and when pulled in the other direction for sod lifting and cultivating.

A further feature of the invention, as will be hereinafter disclosed with greater particularity, is the provision of an ingenious sectional toothed ground-engaging wheel or so-called spider, this being characterized by a well balanced and designed hub structure, readily accessible clamping lugs, and a plurality of associated resilient teeth susceptible of providing the desired sod lifting and clod breaking facilities.

Further novelty is predicated on what will be hereinafter referred to as a multiple spider or wheel and axle assembly, this being characterized by a pair of longitudinally spaced bearing assemblies or units to accommodate the wheel and axle assembly, there being a single axle and a series of four wheels, the inner one of which is keyed to rotate with the axle, and the other ones of which are spring pressed into abutting relation in such a manner as to rotate with the axle except when a turn at the end of the field is made, whereupon the latter wheels have independent differential speed rotation as hereinafter specifically described.

Other more specific structural features and advantages will become more readily apparent from the following description and drawings.

In the accompanying drawings, wherein like numerals are employed to designate like parts throughout the views:

Figure 1 is a top plan view of the complete new type two-way cultivator or ground conditioning machine constructed in accordance with the principles of the present invention.

Figure 2 is an end view thereof showing how the curved teeth of the toothed wheels function as clod breakers.

Figure 3 is a view like Figure 1 showing the yoke swung over through an appropriate half-circle occupying a horizontal draft plane to allow the machine to be pulled in the opposite direction.

Figure 4 is an end view of Figure 3 showing the manner in which the teeth function as sod lifting means.

Figure 5 is an enlarged elevational view of one of the toothed spiders or wheels disclosing the specific construction preferred for the purpose.

Figure 6 is a horizontal sectional view through Figure 5.

Figure 7 is an enlarged face view looking at the concaved side of the novel hub disclosing the particular features comprised therein.

Figure 8 is a sectional view through the hub seen in Figure 7 with one of the double tooth members in place showing the lug clamping means.

Figure 9 is a detail view of one of the clamping lugs.

Figure 10 is a view in section and elevation disclosing the multiple wheel and axle assembly, said view being calculated to bring out the differential action of the two end wheels.

Figure 11 is a fragmentary end view of Figure 10 observing it in a direction from right to left.

Figure 12 is an enlarged detail view with certain portions of the structure removed to emphasize a coupling pin arrangement between the wheel hub and associated flanged bushing.

Figure 13 is an end view of the flanged or headed inner end of one of the two axle members.

Attention is first invited to the diagrammatic views of the structure disclosed in Figures 1 to 4, inclusive. The aforementioned yoke or frame is denoted by the numeral 15. This comprises a substantially V-shaped portion 16 having spaced pivotally mounted terminal arms 17. The numeral 18 designates a cross-brace and the central portion of the features 16 and 18 are provided with suitable guides 20 in which the beam or draft bar 19 is slidably mounted. This is adjustably maintained in place by a removable connecting pin 21 of any suitable type. The converging axles 22 and 23 are pivotally attached to the ends of the frame arms 17 and the inner adjacent ends of said axles are joined by links 24 to the adjacent end of the slidable beam or drawbar 19. More specifically, bearing units are pivotally attached to the ends of the arms 17 and corresponding bearings are attached to the ends of the links 24. These bearing units serve to accommodate the shafts 22 and 23. Before describing the construction of the bearing units, it is desirable to point out that on each shaft 22 and 23 are the multiple tooth spider units or ground-engaging wheels A, B, C, and D, functioning as depicted in Figures 2 and 4. Each wheel includes a hub unit and series of radial teeth, and these will be described separately and collectively. The teeth 25 are of spring steel stock and are generally cylindrical in cross-sectional form. Instead of making the teeth individually and clamping them in the hub, it is desirable to utilize a substantially V-shaped tooth unit of the type seen in Figure 10. The teeth proper are denoted by the numerals 25 as already indicated and the connecting or bight portion is differentiated by the numeral 26. It will be observed that the teeth are curved or bowed longitudinally in a circumferential direction and are further bowed radially as shown in Figure 8 in what may be described as a lateral direction in relation to the hub. This two-way curvature or shaping of the teeth provides the desired centrifugal action and makes efficient the combined sod lifting and clod breaking function depicted in the drawings.

Attention is now invited to the wheel assembly characterized by the concavo-convex hub member 27 shown in Figure 7. It is of general disk-like form and includes the central shaft portion 28 and the surrounding dished plate portion braced by radial webs or ribs 29. The marginal edge of the plate is formed laterally into a rim or flange 30 and this is provided with equi-distant circumferentially spaced keeper notches 31. The numerals 32 designate bolt holes and these register with notched lugs 33. It follows, therefore, that the bight portion 26 of each tooth unit fits into the seat or lug 33 while the arm portions are located in the adjacent pairs of keeper notches 31. The clamping bracket or lug is denoted by the numeral 34 and is held in place by a bolt 35 passing therethrough and through the bolt hole 32. The lug 34 is substantially segmental in form and has its inner apex end 36 fashioned to cooperate with the lug 33 and has its outer marginal edge formed with notches 37 to match with the notches 31 and to thereby clamp the end or arm portions of the tooth unit firmly in the respective notches.

Considering now the sectional bearing units disclosed in Figure 10, it will be observed that each unit comprises a bearing sleeve 38 to accommodate the axle or shaft 23. This sleeve is formed with abutment flanges 39 and is surrounded by a sectional maple wood outer sleeve 40 confined between said flanges. These members 38 and 40 are housed or encased in what may be called a surrounding shell or casing made up of complemental half-sections 41 and 42. It will be noticed (Figures 1 and 3) that the companion sections of the casing 41 and 42 are provided with outstanding ears 44 to accommodate pivot and attaching bolts 45. Thus, as before indicated, the bearing units are pivotally attached to the arms 17 of the frame and to the outer ends of the links 24. It follows, therefore, that each shaft 22 or 23 is journaled in its pair of companion bearing units.

As before indicated, novelty is predicated upon the throw-over frame 15 cooperable with the bearings, shafts and ground-engaging wheels whereby to accomplish the two-way sod lifting and clod breaking operations evidenced from Figures 1 and 3 in conjunction with the explanatory diagram Figures 2 and 4. In Figure 2 the toothed wheel is shown functioning as a so-called clod breaker. In Figure 4, where the frame has been thrown over and the machine is pulled in the opposite direction, the toothed wheel is then functioning as a sod lifter.

Added to the foregoing idea is the slidable draw-bar 19 associated with the frame 15 and connected by the links 24 with the shafts 22 to regulate the divergence or angularity thereof.

Furthermore, the particular construction of the bearing unit, the toothed wheels and hub assembly is considered to be a noteworthy improvement in this particular line of endeavor.

In practice it is understood that when turning corners with the machine, the inner ends of the two axles 22 and 23 quite frequently swing into approximate end-to-end alignment with each other. In order to take care of this end thrust action, I have found it expedient and practicable to equip the adjacent inner ends of the two axles with buffer or bumper means. That is to say, as shown for example in Figure 10 and also brought out diagrammatically in Figures 1 and 3, the two inner spiders are provided with concavo-convex end thrust heads 46. These heads or washers come together into rolling contact, as illustrated for instance in dotted lines in Figure 1. This in itself is not, however, a new feature, but is believed to add to the utility of the machine.

Directing attention now to Figures 10, 11, 12 and 13, it will be observed that the four spiders or wheels are conveniently differentiated by the letters A, B, C and D. At the left in Figure 10, it will be noted that the hub of the spider or wheel D carries one of the aforementioned end thrust heads 46. This is formed integral with the hub and has in its outer face a socket for reception of the driving head on the axle 23. Also, the hub 28 is joined for driving connection with the flanged bushing 38 through the instrumentality of what may be called a coupling pin 47. The two central wheels B and C have their hub portions in abutting relationship, and the hub of the wheel 6 also abuts the adjacent flanged end of the bushing or sleeve 38 just described at the left in Figure 10. The hub of the wheel B is in friction abutting contact with the remaining flanged bushing 38 at the right in said Figure 10. The last-named bushing 38 is coupled or joined to the hub 28 of the wheel A by a coupling pin 48. On the outer threaded end of the axle 23 is a nut and washer arrangement and interposed between the washer and the adjacent end of the hub 28 is a heavy coiled spring 49 surrounding said axle. When the machine is traveling straight across a field, the whole assembly comprising the axle 23, the wheels A, B, C, and D, and the spools or bushings 38 turn as a unit in the respective wooden bushing 40. When rounding a corner, the spiders A, B, C, and D will have to have a differential speed rotation and it is evident that this is where the spring thrust means 49 and 50 come into play. During this turning operation, the wheel D, being rigid on the shaft through the instrumentality of the shaft head and connection 46, turns with the shaft and carries with it the adjacent spool or bushing 38. The three wheels A, B and C, however, being free to turn on the shaft when subjected to this overcoming tension will each turn independently to allow the machine to be properly turned around to travel in a reverse direction.

The aforesaid self-adapting or accommodating wheel and axle assembly is obviously important in a machine of this type. Then, too, since the arrangement is such as to allow expeditious dismantling or disassembling, the respective parts can be readily repaired or replaced. The wooden bushings 40 afford satisfactory lubrication, and when said bushings become unduly worn, they can be readily replaced. Hence, the axle and wheel assembly is probably unique, and so are the bearing assemblies. In particular, novelty would appear to reside in the rigidly attached wheel D on the axle 23 in Figure 10, and the associated wheels A, B and C thrust longitudinally by the spring 49 into normal frictional driving contact allowing the whole assembly to turn as described. The features having been carefully selected offer their proportionate share in contributing to the success of the novel arrangement depicted in Figure 10.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structural assemblage of the class described, a substantially U-shaped yoke embodying spaced paralled arms, the central portion of said yoke being provided with a draw-bar guide, a draw-bar adjustably mounted in said guide and disposed substantially parallel and centrally between the arm portions of the yoke, a pair of horizontally disposed bearing units swingably mounted on the free ends of the arms of said yoke, a pair of links pivotally attached to the rear end of said draw-bar, said links being disposed in adjustable rearwardly diverging relationship, horizontally disposed bearing units pivotally attached to the rear ends of said links, axles mounted for idling rotation in said bearing units, and a plurality of toothed harrow wheels mounted for operation on the axles, said harrow wheels being provided with teeth shaped to function for clod breaking and sod lifting purposes.

2. As a component part of a multiple wheel harrow assembly, a circular hub member including a dished body portion, the marginal outer peripheral portion forming a laterally directed rim, said rim having circumferentially spaced notches, said body portion being further provided adjacent its center with radial circumferentially spaced lugs, said lugs having keeper notches, a plurality of tooth units, each unit being substantially V-shaped in form and having its crotch portion fitting in the keeper notch in the companion lug, the arm portions being located in adjacent keeper notches in said rim, and triple acting clamping members for each tooth unit, each member being of general segmental form and having its apex portion cooperating with the notched lugs and its outer end portion coacting with the adjacent edge of the rim and substantially covering the notches to maintain the arms of the tooth unit in said notches, there being a bolt passing through the body portion and the clamping member in the manner and for the purposes described.

3. In a structure of the class described, a substantially U-shaped yoke including a bight portion, a brace opposed to said bight portion, the central portion of the brace and apex portion of the bight having longitudinally aligned guides, the arm portions of said yoke being pivotally mounted in place to swing in horizontal planes on vertical axes, a draw-bar adjustably mounted in said guides and occupying a position centrally between the pivoted arms, a pair of horizontally disposed bearing units swingably mounted on the free ends of the arms of said yoke, a pair of links pivotally attached to the rear end of said draw-bar, said links being disposed in adjustable rearwardly diverging relationship, a second pair of horizontally disposed bearing units pivotally attached to the rear ends of said links, axles mounted for idling rotation in said respective bearing units, and a plurality of toothed harrow wheels mounted for oscillation on the axles, the inner ends of the respective axles having coacting buffers thereon.

ELDON T. GARD.